US008819563B2

(12) United States Patent
Hass et al.

(10) Patent No.: US 8,819,563 B2
(45) Date of Patent: Aug. 26, 2014

(54) SYSTEMS AND METHODS FOR ACCESSING SYSTEM UTILITIES

(75) Inventors: Jon Robert Hass, Austin, TX (US); Charles Terrence Perusse, Jr., Pflugerville, TX (US); Elie Jreij, Pflugerville, TX (US); Abhay Arjun Salunke, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 676 days.

(21) Appl. No.: 12/062,263

(22) Filed: Apr. 3, 2008

(65) Prior Publication Data

US 2009/0254863 A1 Oct. 8, 2009

(51) Int. Cl.
*G06F 3/00* (2006.01)
*G06F 3/048* (2013.01)

(52) U.S. Cl.
USPC ........... 715/741; 715/810; 715/781; 715/782; 715/764; 715/758

(58) Field of Classification Search
USPC .......................................... 715/810, 764, 741
See application file for complete search history.

(56) References Cited

U.S. PATENT DOCUMENTS

| | | | |
|---|---|---|---|
| 6,346,954 B1 * | 2/2002 | Chu et al. ...................... | 715/764 |
| 6,665,786 B2 * | 12/2003 | McMichael et al. .......... | 711/173 |
| 6,690,400 B1 * | 2/2004 | Moayyad et al. ............. | 715/779 |
| 6,763,458 B1 * | 7/2004 | Watanabe et al. ............. | 713/100 |
| 6,915,393 B2 * | 7/2005 | Collins et al. ................. | 711/153 |
| 7,107,534 B1 * | 9/2006 | de Jong et al. ................ | 715/734 |
| 7,277,978 B2 * | 10/2007 | Khatami et al. .............. | 711/103 |
| 7,322,010 B1 * | 1/2008 | Mikula ......................... | 715/734 |
| 7,562,208 B1 * | 7/2009 | Reed et al. ........................ | 713/1 |
| 7,702,897 B2 * | 4/2010 | Reed et al. .................... | 713/100 |
| 2002/0019908 A1 * | 2/2002 | Reuter et al. .................. | 711/112 |
| 2006/0195658 A1 * | 8/2006 | Kanbe et al. .................. | 711/114 |
| 2007/0239927 A1 * | 10/2007 | Rogers et al. ................. | 711/103 |
| 2008/0120613 A1 * | 5/2008 | Dandekar et al. ............. | 717/175 |

OTHER PUBLICATIONS

Microsoft.com, Windows XP Best practices for partitioning a hard disk, Jun. 6, 2005, pp. 1-3.*
Microsoft Corp, Windows XP SP2, Aug. 2004, pp. 1-9.*
Microsoft.Com, Windows XP SP2 Release, Aug. 6, 2004, pp. 1-3.*
U.S. Appl. No. 11/949,893 entitled USB Key Emulation System to Multiplex Information, 12 pages, filed Dec. 4, 2007.
Definition; "Flash Memory"; Microsoft Computer Dictionary, Fourth Edition; p. 188, 1999.

* cited by examiner

*Primary Examiner* — Amy Ng
*Assistant Examiner* — Erik Stitt
(74) *Attorney, Agent, or Firm* — Baker Botts L.L.P.

(57) ABSTRACT

In one embodiment, an information handling system may include a processor, a display that may provide a user interface allowing a user to select one or more system utilities to be accessed, memory that may include a plurality of memory partitions storing a plurality of system utilities, and a management controller. During a configuration of the information handling system, the management controller may receive a request from the user via the user interface to access one or more selected system utilities; identify one or more memory partitions storing the one or more selected system utilities; and cause the display to display one or more user-selectable icons corresponding to the one or more identified memory partitions to provide the user access to the one or more identified memory partitions.

14 Claims, 2 Drawing Sheets

SYSTEMS AND METHODS FOR ACCESSING SYSTEM UTILITIES

TECHNICAL FIELD

The present disclosure relates in general to management controllers, and more particularly to accessing system utilities stored in memory via a management controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Generally, information handling systems are packaged with one or more media forms (e.g., CD-ROM media, CD-RW media, CD-R media, DVD-ROM media, DVD-RW media, DVD-R media, USB storage device, tape drive, floppy disk, etc.) that contain system configurations, drivers, routines, firmware updates, system diagnostics, software, etc. for deployment. Such media forms provide a user or an application data needed to install, setup, and/or reconfigure the information handling system, which generally takes place during an initial configuration (e.g., an out-of-the box setup) or after the information handling system has been in use (e.g., a reconfiguration, system update, etc.). However, one common drawback of these packaged media forms sent with the information handling systems is the tendency of some users to misplace or lose them.

SUMMARY

In accordance with the teachings of the present disclosure, disadvantages and problems associated packaged media forms containing system utilities may be substantially reduced or eliminated.

In one embodiment, an information handling system may include a processor, a display that may provide a user interface allowing a user to select one or more system utilities to be accessed, memory that may include a plurality of memory partitions storing a plurality of system utilities, and a management controller. During a configuration of the information handling system, the management controller may receive a request from the user via the user interface to access one or more selected system utilities; identify one or more memory partitions storing the one or more selected system utilities; and cause the display to display one or more user-selectable icons corresponding to the one or more identified memory partitions to provide the user access to the one or more identified memory partitions.

In another embodiment, an apparatus may include a display configured to display a user interface for requesting access to system utilities and a management controller coupled to the display. During a configuration of a system, the management controller may receive from a user, via the user interface displayed on the display a request to access one or more of a plurality of system utilities; and identify one or more memory partitions of a memory device storing the one or more requested system utilities. The display may display one or more user-selectable icons corresponding to the one or more identified memory partitions to provide the user access to the one or more identified memory partitions.

In another embodiment, a method includes receiving a request for access to one or more of a plurality of system utilities during a configuration of a system, the request received from a user via a user interface displayed on a display; identifying one or more of a plurality of memory partitions of a memory device storing the one or more requested system utilities; and providing the user access to the one or more identified memory partitions by displaying on the display one or more user-selectable icons corresponding to the one or more identified memory partitions.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and/or a video display. The information handling system may also include one or more buses operable to transmit communications between the various hardware components.

Figure 1:
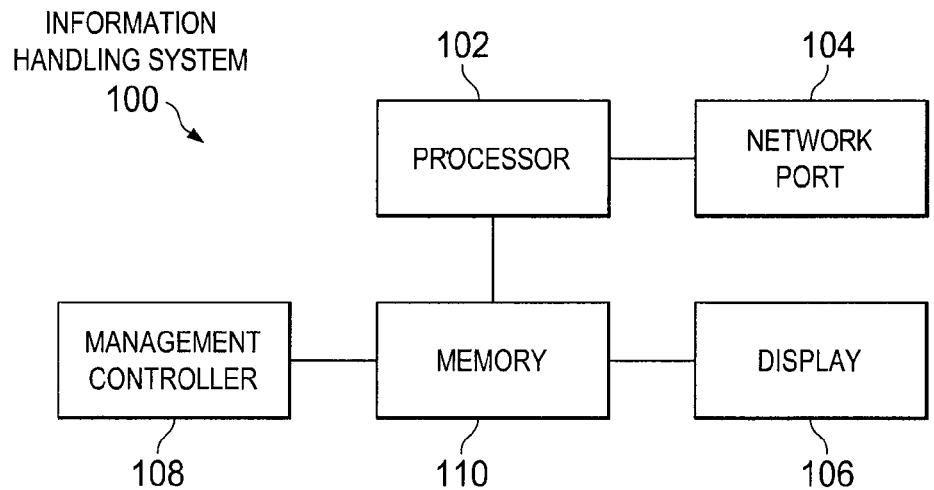
FIG. 1 illustrates an example information handling system including a management controller and memory storing one or more system utilities, in accordance with embodiments of the present disclosure.

FIG. 1 illustrates a block diagram of an example information handling system 100, in accordance with certain embodiments of the present disclosure. As shown in FIG. 1, information handling system 100 may include a processor 102, a network port 104, a display 106, a management controller 108, and memory 110.

Processor 102 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 110 and/or another component of information handling system 100 and may output results, graphical user interfaces (GUIs), websites, and the like via a display and/or over network port 104.

Network port 104 may be any suitable system, apparatus, or device operable to serve as an interface between information handling system 100 and a network. Network port 104 may enable information handling system 100 to communicate over a network using any suitable transmission protocol and/or standard, including without limitation all transmission protocols and/or standards known in the art.

Display 106 may comprise any display device suitable for creating graphic images and/or alphanumeric characters recognizable to a user, and may include, for example, a liquid crystal display (LCD) or a cathode ray tube (CRT). In some embodiments, display 106 may provide a graphical user interface (GUI) or menu to a user for access to one or more portions of memory 110.

Management controller 108 may be coupled to processor 102 and may be embodied in hardware (e.g., system, device, or apparatus), software, or a combination thereof and operable to provide read and/or write access to a portion, multiple portions, or all of memory 110 after a request by a user is received (e.g., via a selection in the GUI or menu displayed by display 106). In one embodiment, the request may be made during the setup of information handling system 100 or during the reconfiguration (e.g., an upgrade, repair, restoration) of information handling system 100. In the same or alternative embodiments, access to the system utilities may be granted to a user at any other suitable time.

Memory 110 may be coupled to processor 102 and may comprise any system, device, or apparatus operable to retain program instructions or data for a period of time. Memory 110 may be random access memory (RAM), electrically erasable programmable read-only memory (EEPROM), a PCM-CIA card, flash memory, or any other type(s) and/or array of volatile or non-volatile memory.

In one embodiment, memory 110 may include one or more system utilities including, for example, system diagnostics, drivers, applications, configuration data, deployment data, other system parameters and/or configuration parameters, etc. In contrast to previous techniques that separately bundle one or more media forms (e.g., CDs or other disks) with an information handling system, according to the present disclosure, system utilities may be stored within information handling system 100 (e.g., in flash memory) to provide a user on-demand access to the system utilities.

Figure 2:
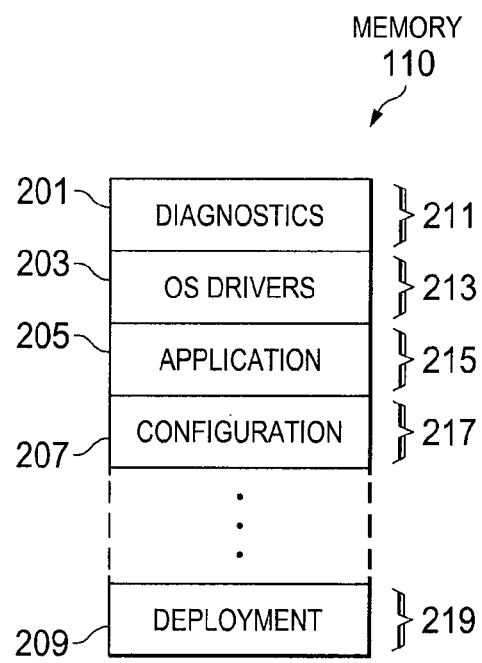
FIG. 2 illustrates an example system memory including one or more system utilities, in accordance with embodiments of the present disclosure.

FIG. 2 illustrates an example block diagram of memory 110, in accordance with certain embodiments of the present disclosure. In some embodiments, memory 110 may be a flash memory that may store one or more system utilities, allowing the contents of memory 110 to be retained after a power source is removed or information handling system 100 fails. Memory 110 may be one of many memory devices or may be integrated into a single memory device of information handling system 100.

In some embodiments, memory 110 may be partitioned, each partition storing a particular type of system utility. For example, as shown in FIG. 2, memory 110 may be partitioned into partitions 211, 213, 215, 217, and 219, where each partition may store one or more system utilities. For example, systems diagnostics data 201 may be stored in partition 211, operation system drivers 203 may be stored in partition 213, applications 205 may be stored in partition 215, system configuration data 207 may be stored in partition 217, and deployment 209 may be stored in partition 219. Memory 110 may also store other system utilities, utilities, data, and/or program instructions or a combination of utilities 211, 213, 215, 217, and/or 219.

In one embodiment, partitions 211, 213, 215, and/or 217 may not be visible to a user unless a request from the user is received by management controller 108. Hiding partitions 211, 213, 215, and/or 217 may allow the data stored to be protected from accidental tampering, deleting, or other unnecessary editing.

In operation, a user or an application may request access to one or more system utilities via a GUI or menu displayed on display 106. For example, the user may need to run diagnostics data 201 or application 205 during a reconfiguration of information handling system 110, and may request access to such system utilities via a menu or GUI on display 106. Management controller 108 may receive the request and may access partitions 211 and 215 of memory 110 storing the requested system utilities 201 and 205.

Figure 4:
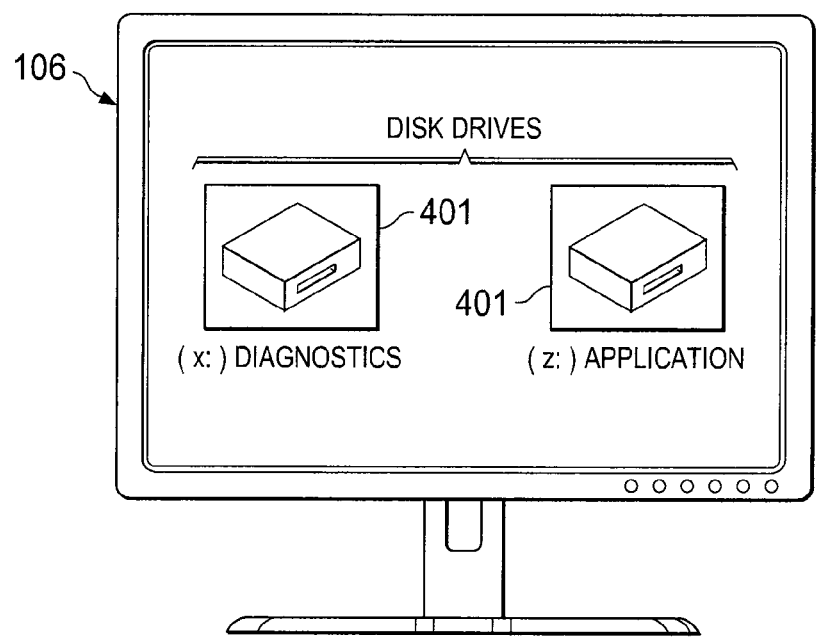
FIG. 4 illustrates an example display including drive icons for accessing system utilities, in accordance with embodiments of the present disclosure.

Management controller 108 may provide the user access to the requested system utilities 201 and 205 by providing disk drive icons 401 on display 106, as shown in FIG. 4. The disk drive icon may provide the user access to the necessary files of the requested system utilities, when needed, while protecting non-requested data stored in memory 110 from be overwritten, altered, etc. In other words, partition(s) of memory 110 may be assigned disk drive icon 401 and may include files that may be accessible (e.g., read-only) to a user when a user clicks on or otherwise selects drive icon 401. Although disk drive icons are discussed, any icons including folder icons, network icons, computer icons, or other similar icons may be used to indicate to the user that the information is available for access.

Disk drive icons 401 may be displayed for a predetermined of time after which management controller 108 and/or processor 102 may "hide" the icons 401. In this manner, the requested system utility or system utilities may not be available after the predetermined amount of time has lapsed unless another request from a user is received by management controller 108. In some instances, the user may indicate via the GUI or menu that the system utility or system utilities are no longer needed. Management controller 108 and/or processor 102 may subsequently take the partitions off-line and hide their respective icons 401 until another request is received.

Figure 3:
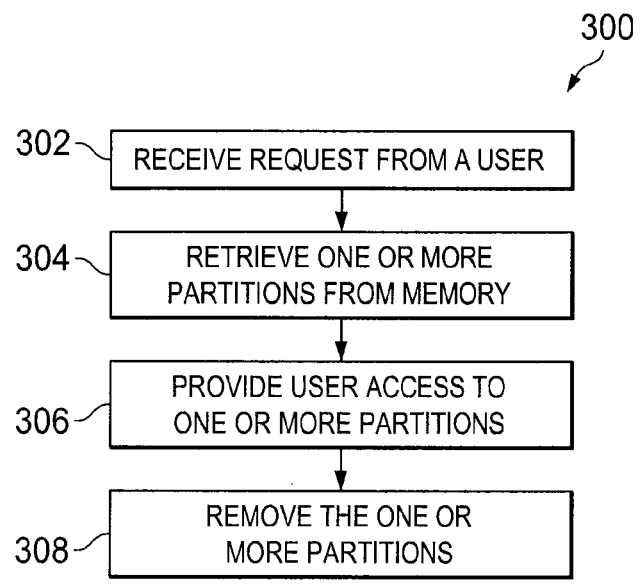
FIG. 3 illustrates a flowchart of a method for on-demand system utility access, in accordance with embodiments of the present disclosure.

FIG. 3 illustrates a flow chart of an example method 300 for accessing system utilities, in accordance with embodiments of the present disclosure. In one embodiment, at step 302, management controller 108 may receive a request from a user to access at least one system utility (e.g., systems diagnostics 201, operation system drivers 203, applications 205, system configuration data 207, and/or deployment 209). The request may be made at the time information handling system 100 is being setup (e.g., out-of-the-box configuration). Alternatively, the request may be made after information handling system 100 is in use (e.g., system 100 upgrade, repair, restore, etc.) or other suitable time.

In some embodiments, the request may be made via a GUI or menu displayed on display 106. The user may select from a list of system utilities stored in memory 110. Processor 102 may receive the request and may forward the request to management controller 108. In a network, the request may be made via a remote display 106. The request may be transferred over a network (e.g., a LAN, a WAN, the Internet, etc.) and received by management controller 108.

At step 304, management controller 108 may retrieve the partition(s) storing the selected system utility or system utilities from memory 110. At step 306, display 106 may display icon(s) (e.g., disk drive icons 401) to a user, each icon providing the user access to a selected system utility. The user may access the selected system utility or system utilities (e.g., data, files, folders, etc.) by clicking on the displayed icon(s).

At step 308, management controller 108 may remove/hide the icon(s) (e.g., thus hiding the accessed partitions) such that a user may not be able to read, write, or otherwise access the system utility or system utilities. In one embodiment, management controller 108 may remove the icon(s) after a user indicates that the requested system utility or system utilities are no longer needed. Management controller 108 may update one or more memory partitions as needed based at least on changes made by the user, and may save the changes in the respective partitions of memory 110 and subsequently hide the memory partitions from access. In some embodiments, management controller 108 may hide or remove the icon(s) after a predetermined time has lapsed. The predetermined time may be set by manually set by user or may be set by management control 108 and/or processor 102. After the predetermined time has lapsed, management controller 108 may update any relevant memory partitions as needed and hide or remove the corresponding icon(s) from access until a subsequent request is received.

The present disclosure provides an efficient system and method for providing on-demand access to system utilities. Other configurations, including network configurations benefit from the techniques and systems described herein. For example, the system utilities for one, some, or all information handling systems 100 in a network configuration may be stored in memory 110. A user may access the system utilities for the entire network remotely and may configure, reconfigure, repair, and/or update one or more information handling system 100.

Although the present disclosure has been described in detail, it should be understood that various changes, substitutions, and alterations can be made hereto without departing from the spirit and the scope of the invention as defined by the appended claims.

What is claimed is:

1. An information handling system, comprising:
    a processor;
    memory coupled to the processor, the memory including a plurality of memory partitions storing a plurality of system utilities, the plurality of memory partitions including a first memory partition storing systems diagnostics data, a second memory partition storing operation system drivers, a third memory partition storing system configuration data, a fourth memory partition storing deployment data, and a fifth memory partition storing an application;
    a display coupled to the processor, the display providing a user interface allowing a user to select one or more of the system utilities to be accessed; and
    a management controller embodied in hardware coupled to the processor, wherein during a configuration of the information handling system, the management controller is configured to:
        receive a request from the user via the user interface to access one or more selected system utilities stored on one or more memory partitions that are hidden from the user interface;
        in response to receiving the request, identify one or more memory partitions storing the one or more selected system utilities;
        in response to identifying the one or more memory partitions, cause the user interface to display one or more user-selectable icons corresponding to the one or more identified memory partitions to provide the user access to the one or more identified memory partitions;
        update the one or more identified memory partitions based on a chance made by the user; and
        remove the one or more user-selectable icons from the user interface after a pre-determined time has elapsed.

2. The information handling system of claim 1, wherein the display provides a user interface or menu to the user.

3. The information handling system of claim 1, wherein the memory is a flash memory.

4. The information handling system of claim 1, wherein the one or more user-selectable icons comprise one or more disk drive icons.

5. The information handling system of claim 1, wherein the configuration of the information handling system comprises during an out-of-box configuration or during a reconfiguration of the information handling system.

6. An apparatus, comprising:
    a display configured to display a user interface for requesting access to system utilities; and
    a management controller embodied in hardware coupled to the display and configured to:
        during a configuration of a system receive from a user, via the user interface displayed on the display, a request to access one or more of a plurality of system utilities stored on one or more memory partitions that are hidden from the user interface;
        in response to receipt the request, identify one or more memory partitions of a memory device storing the one or more requested system utilities; and
        update the one or more identified memory partitions based on a chance made by the user; and
        remove one or more user-selectable icons from the user interface after a pre-determined time has elapsed;
    the memory device comprising a plurality of memory partitions including a first memory partition storing systems diagnostics data, a second memory partition storing operation system drivers, a third memory partition storing system configuration data, a fourth memory partition storing deployment data, and a fifth memory partition storing an application; and
    the user interface configured to display one or more user-selectable icons corresponding to the one or more identified memory partitions to provide the user access to the one or more identified memory partitions, in response to identification of the one or more memory partitions.

7. The apparatus claim 6, wherein the memory device is a flash memory.

8. The apparatus of claim 6, wherein the one or more icons comprise one or more disk drive icons.

9. The apparatus of claim 6, wherein the display provides a user interface or menu to the user.

10. The apparatus of claim 6, wherein the configuration of the system comprises an out-of-box configuration or a reconfiguration of the system.

11. A method, comprising:
   during a configuration of a system, receiving a request for access to one or more of a plurality of system utilities stored on one or more memory partitions that are hidden from the user interface, the request received from a user via a user interface displayed on a display;
   in response to receiving the request, a management controller embodied in hardware coupled to the processor identifying one or more of a plurality of memory partitions of a memory device storing the one or more requested system utilities, the plurality of memory partitions including a first memory partition storing systems diagnostics data, a second memory partition storing operation system drivers, a third memory partition storing system configuration data, a fourth memory partition storing deployment data, and a fifth memory partition storing an application;
   in response to identifying the one or more memory partitions, providing the user access to the one or more identified memory partitions by displaying on the user interface one or more user-selectable icons corresponding to the one or more identified memory partitions;
   updating the one or more identified memory partitions based on a change made by the user; and
   removing the one or more user-selectable icons from the user interface after a pre-determined time has elapsed.

12. The method of claim 11, wherein the one or more user-selectable icons comprise one or more disk drive icons.

13. The method of claim 11, wherein the memory device is a flash memory.

14. The method of claim 11, wherein the configuration of the system comprises an out-of-box configuration or a reconfiguration of the system.

\* \* \* \* \*